(12) United States Patent
Huang

(10) Patent No.: US 12,370,490 B2
(45) Date of Patent: Jul. 29, 2025

(54) INTEGRATED AIR INLET AND OUTLET VALVE AND PRESSURE SWING ADSORPTION AIR PATH SYSTEM

(71) Applicant: HUNAN ZOY TECHNOLOGY CO., LTD., Changsha (CN)

(72) Inventor: Gang Huang, Changsha (CN)

(73) Assignee: HUNAN ZOY TECHNOLOGY CO., LTD., Changsha (CN)

( * ) Notice: Subject to any disclaimer, the term of this patent is extended or adjusted under 35 U.S.C. 154(b) by 0 days.

(21) Appl. No.: 18/012,160

(22) PCT Filed: May 31, 2022

(86) PCT No.: PCT/CN2022/096301
§ 371 (c)(1),
(2) Date: Dec. 21, 2022

(87) PCT Pub. No.: WO2023/109024
PCT Pub. Date: Jun. 22, 2023

(65) Prior Publication Data
US 2024/0226797 A1 Jul. 11, 2024

(30) Foreign Application Priority Data
Dec. 17, 2021 (CN) .......................... 202111550501.3

(51) Int. Cl.
*B01D 53/04* (2006.01)
*B01D 53/047* (2006.01)
*F16K 11/22* (2006.01)

(52) U.S. Cl.
CPC ....... *B01D 53/0446* (2013.01); *B01D 53/047* (2013.01); *F16K 11/22* (2013.01); *B01D 2256/12* (2013.01)

(58) Field of Classification Search
CPC .. B01D 53/04; B01D 53/0446; B01D 53/047; B01D 2256/12; B01D 2258/06;
(Continued)

(56) References Cited

U.S. PATENT DOCUMENTS 4,162,146 A * 7/1979 Seibert .................. B01D 53/04
96/113
5,604,991 A * 2/1997 Castle .................. B01D 53/261
34/80
(Continued)

FOREIGN PATENT DOCUMENTS

| CN | 201168541 Y | 12/2008 |
|---|---|---|
| CN | 101455935 A | 6/2009 |
| CN | 201350388 Y | 11/2009 |
| CN | 102580482 A | 7/2012 |

(Continued)

*Primary Examiner* — Frank M Lawrence, Jr.
(74) *Attorney, Agent, or Firm* — The Webb Law Firm

(57) ABSTRACT

An integrated air inlet and outlet valve and a pressure swing adsorption air path system including the integrated air inlet and outlet valve are disclosed. The integrated air inlet and outlet valve includes a valve body, the valve body is provided with an air inlet, an air outlet, an exhaust port and two air path control units, the air path control unit includes a first air inlet and outlet port, a second air inlet and outlet port, a first control valve, a second control valve and a connecting channel, the second air inlet and outlet port is connected with the air outlet through a one-way valve which enables air to flow to the air outlet in one direction only, and the second air inlet and outlet ports of the two air path control units are connected through a throttle valve.

17 Claims, 12 Drawing Sheets

(58) Field of Classification Search
CPC ........... B01D 2259/40003; F16K 11/10; F16K 11/22; F16K 15/18; F16K 27/0263; F16K 31/1225
USPC .......................... 96/121; 128/205.24, 205.27
See application file for complete search history.

(56) References Cited

U.S. PATENT DOCUMENTS

| | | | | |
|---|---|---|---|---|
| 5,827,358 | A | * 10/1998 | Kulish | ............... B01D 53/0407 96/144 |
| 2013/0061755 | A1 | * 3/2013 | Frederick | ........... B01D 53/0446 96/110 |
| 2021/0102638 | A1 | * 4/2021 | Fulton | ................. F16K 31/1225 |

FOREIGN PATENT DOCUMENTS

| | | | |
|---|---|---|---|
| CN | 103566717 | A | 2/2014 |
| CN | 104147895 | A | 11/2014 |
| CN | 203979505 | U | 12/2014 |
| CN | 106594327 | A | 4/2017 |
| CN | 107366763 | A | 11/2017 |
| CN | 107469565 | A | 12/2017 |
| CN | 108136313 | A | 6/2018 |
| CN | 108619859 | A | 10/2018 |
| CN | 208340443 | U | 1/2019 |
| CN | 110526217 | A | 12/2019 |
| CN | 210584367 | U | 5/2020 |
| CN | 114159928 | A | 3/2022 |
| DE | 102014012645 | A1 * | 2/2016 ............ F15B 21/041 |
| JP | 2006116500 | A | 5/2006 |
| WO | 2018178661 | A1 | 10/2018 |
| WO | 2019201631 | A1 | 10/2019 |

\* cited by examiner

INTEGRATED AIR INLET AND OUTLET VALVE AND PRESSURE SWING ADSORPTION AIR PATH SYSTEM

CROSS-REFERENCE TO RELATED APPLICATIONS

This application is the United States national phase of International Application No. PCT/CN2022/096301 filed May 31, 2022, and claims priority to Chinese Patent Application No. 202111550501.3 filed Dec. 17, 2021, the disclosures of which are hereby incorporated by reference in their entirety.

BACKGROUND

Technical Field

The disclosure relates to the technical field of compressed air purifying devices, in particular to an integrated air inlet and outlet valve and a pressure swing adsorption air path system.

Technical Description

In the field of compressed air purifying, it is often necessary to have the reversing function of air intake and exhaust due to special air intake requirements. For example, FIG. 1 shows a typical pressure swing adsorption oxygen-making air path system used in an existing oxygen-making machine. The working process and principle of this pressure swing adsorption oxygen-making air path system are described as follows. A first solenoid valve 1 and a fourth solenoid valve 4 cooperate with each other to form a first air path loop, and a second solenoid valve 2 and a third solenoid valve 3 cooperate with each other to form a second air path loop. When the first adsorption tower 100 is working, the second solenoid valve 2 and the third solenoid valve 3 are turned off, a fifth solenoid valve 5 and a six solenoid valve 6 are turned off, while the first solenoid valve 1 and the fourth solenoid valve 4 are turned on, and an air source enters the first adsorption tower 100 through the first solenoid valve 1. The first adsorption tower 100 is filled with adsorbent, and most of the purified air enters downstream and is supplied to an air consuming device, and a small part (about 16% to 20%) enters the second adsorption tower 200 through a throttle valve 7 (an air pressure after passing through the throttle valve 7 is approximately equal to an atmospheric pressure) to blow back (or analyze and regenerate) impurity air trapped in the adsorbent in last cycle. After the blowback air passes through the second adsorption tower 200, tail air is exhausted through the fourth solenoid valve 4. When the second adsorption tower 200 is working, the first solenoid valve 1 and the fourth solenoid valve 4 are turned off, the fifth solenoid valve 5 and the six solenoid valve 6 are turned off, while the second solenoid valve 2 and the third solenoid valve 3 are turned on, and the air source enters the second adsorption tower 200 through the second solenoid valve 2. The second adsorption tower 200 is filled with adsorbent, and most of the purified air enters downstream and is supplied to an air consuming device, and a small part (about 16% to 20%) enters the first adsorption tower 100 through the throttle valve 7 (the air pressure after passing through the throttle valve 7 is approximately equal to the atmospheric pressure) to blow back (or analyze and regenerate) the impurity air trapped in the adsorbent in last cycle. After the blowback air passes through the first adsorption tower 100, the tail air is exhausted through the third solenoid valve 3. The first air path loop and the second air path loop work alternately, so that the air source alternately passes through the first adsorption tower 100 and the second adsorption tower 200 for purification, and meanwhile, when one adsorption tower is working, the other adsorption tower is supplied with the blowback air for adsorbent regeneration.

In order to avoid the influence of sudden pressure change on the downstream air consuming device and slow down the pulverization of the adsorbents in the first adsorption tower 100 and the second adsorption tower 200 due to the sudden pressure change, a pressure equalization stage will be added to the inlet air before the first adsorption tower 100 and the second adsorption tower 200 are switched. Meanwhile, in order to improve oxygen-making recovery efficiency and reduce energy consumption, a top-bottom pressure equalization method is adopted (air enters from the top of the adsorption tower to gradually build up pressure in the adsorption tower to complete pressure equalization): after the adsorbent in the second adsorption tower 200 is fully regenerated, the fourth solenoid valve 4 is turned off in advance, and the fifth solenoid valve 5 is opened at the same time, so that the pressure in the second adsorption tower 200 is gradually increased from normal pressure to working pressure, then the first solenoid valve 1 and the fifth solenoid valve 5 are turned off, and meanwhile, the second solenoid valve 2 and the third solenoid valve 3 are turned on.

However, in the existing pressure swing adsorption oxygen-making air path system, all valves are connected by pipelines, which is cumbersome and inconvenient to install and maintain. Moreover, each adsorption tower is a container with a bottom inlet and an upper outlet, that is, the air inlet end and the air outlet end of the adsorption tower are respectively arranged at upper and lower ends of the adsorption tower. In order to match this air inlet and outlet structure and mode, the air inlet end and the air outlet end of an air dryer also need to be distributed at opposite ends of the adsorption tower, which will increase the overall height of the device, resulting in large device volume and much occupied space.

SUMMARY

A technical problem to be solved by the disclosure is to overcome the shortcomings of the existing technology, provide an integrated inlet and outlet valve which can greatly reduce connecting pipelines, is simple and convenient to install and maintain, compact in structure, occupies less space, has low manufacturing cost and low failure rate, and also correspondingly provide a pressure swing adsorption air path system using the integrated inlet and outlet valve.

In order to solve the foregoing technical problem, the disclosure employs the following technical solutions.

An integrated air inlet and outlet valve includes a valve body, wherein the valve body is provided with an air inlet, an air outlet, an exhaust port and two air path control units, each of the air path control units includes a first air inlet and outlet port, a second air inlet and outlet port, a first control valve, a second control valve and a connecting channel connecting the first control valve and the second control valve, the first control valve is configured for controlling the first air inlet and outlet port to be selectively communicated with the air inlet or the connecting channel, the second control valve is configured for controlling the connecting channel to be selectively communicated with the exhaust port or the second air inlet and outlet port, the second air inlet and outlet port is connected with the air outlet through a one-way valve which enables air to flow to the air outlet in one direction only, and the second air inlet and outlet ports of the two air path control units are connected through a throttle valve.

In the integrated air inlet and outlet valve above, preferably, the first control valve includes a first valve housing, a first piston mounted in the first valve housing, a first valve sheet connected with the first piston and a first driving assembly configured for driving the first piston to reciprocate linearly, the first valve housing is detachably installed in an inner cavity provided in the valve body and defines a first ventilation cavity, the first ventilation cavity is provided with a first valve port communicated with the first air inlet and outlet port, a second valve port communicated with the air inlet and a third valve port communicated with the connecting channel, the first valve sheet is located in the first ventilation cavity and is capable of being driven by the first piston reciprocating linearly to selectively seal the second valve port or the third valve port.

In the integrated air inlet and outlet valve above, preferably, the second control valve includes a second valve housing, a second piston mounted in the second valve housing, a second valve sheet connected with the second piston and a second driving assembly configured for driving the second piston to reciprocate linearly, the second valve housing is detachably installed in the inner cavity provided in the valve body and defines a second ventilation cavity, the second ventilation cavity is provided with a fourth valve port communicated with the second air inlet and outlet port, a fifth valve port communicated with the exhaust port and a sixth valve port communicated with the connecting channel, the second valve sheet is located in the second ventilation cavity and is capable of being driven by the second piston reciprocating linearly to selectively seal the fourth valve port or the fifth valve port.

In the integrated air inlet and outlet valve above, preferably, the first ventilation cavities of the two air path control units are communicated through a first communication hole provided in the valve body, the valve body is provided with a first hole extending from outside of the valve body to inside of the valve body and communicated with the first communication hole, and the first hole is used as the air inlet; and the second ventilation cavities of the two air path control units are communicated through a second communication hole provided in the valve body, the valve body is provided with a second hole extending from outside of the valve body to inside of the valve body and communicated with the second communication hole, and the second hole is used as the exhaust port.

In the integrated air inlet and outlet valve above, preferably, one side surface of the valve body is used as a connecting surface, a side valve block is detachably connected to the connecting surface, the side valve block is provided with a third hole and a fourth hole extending from outside of the side valve block to inside of the side valve block corresponding to each air path control unit, the third hole is used as the first air inlet and outlet port, and the fourth hole is used as the second air inlet and outlet port; the third hole of each air path control unit is communicated with the corresponding first valve port through a fifth hole extending from the connecting surface to inside of the valve body; and the connecting channel of each air path control unit includes a recess which is arranged on the connecting surface and covered and sealed by the side valve block, the recess is connected with a sixth hole extending from the recess to inside of the valve body and communicated with the third valve port and a seventh hole extending from the recess to inside of the valve body and communicated with the sixth valve port.

In the integrated air inlet and outlet valve above, preferably, the valve body is provided with a first channel and a second channel extending across the valve body and arranged side by side, two sealing plates which seal two ends of the first channel and the second channel are detachably mounted on the valve body, the valve body is provided with two eighth holes extending from the connecting surface to inside of the valve body, the second air inlet and outlet port of one air path control unit is communicated with one ends of both the first channel and the second channel through one eighth hole, and the second air inlet and outlet port of the other air path control unit is communicated with one ends of both the first channel and the second channel through the other eighth hole; the one-way valves of the two air path control units are mounted in the first channel between the eighth holes at an interval, and the air outlet extends from outside of the valve body to inside of the valve body and is communicated with the first channel between the one-way valves of the two air path control units; and the throttle valve is mounted in the second channel between the two eighth holes.

In the integrated air inlet and outlet valve above, preferably, the fourth valve port of each air path control unit is communicated with the first channel or the second channel which is communicated with the second air inlet and outlet port of the other air path control unit through a first connecting hole arranged on the valve body and a second connecting hole arranged on the sealing plate in turn.

In the integrated air inlet and outlet valve above, preferably, the valve body is a hexahedral block, the exhaust port is arranged on a top surface of the valve body, the air outlet and the air inlet are arranged on a bottom surface of the valve body, the two sealing plates are respectively arranged on left and right surfaces of the valve body, and the side valve block is arranged on a front surface or a rear surface of the valve body.

As a general technical concept, the disclosure further provides a pressure swing adsorption air path system, including two adsorption towers, the adsorption tower having two air inlet and outlet ends, and further including the integrated air inlet and outlet valve above, wherein the first air inlet and outlet ports and the second air inlet and outlet ports of the two air path control units in the integrated air inlet and outlet valve are respectively connected with the two air inlet and outlet ends of the two adsorption towers correspondingly.

In the pressure swing adsorption air path system above, preferably, the two air inlet and outlet ends of the adsorption tower are located at the same end of the adsorption tower.

Compared with the existing technology, the disclosure has the following advantages.

In the integrated inlet and outlet valve of the disclosure, the first control valves and the second control valves, the connecting channels, the one-way valves and the throttle valves of the two air path control units are integrally installed on the valve body. Therefore, when the integrated inlet and outlet valve is used in the pressure swing adsorption system, the integrated air inlet and outlet valve has the advantages of greatly reduced connecting pipelines which avoids the problem of redundant pipeline connections, simple installation and maintenance, reduced failure rate, and good aesthetics. Moreover, the integrated inlet and outlet valve has small overall size and small occupied space, which is beneficial to reducing the manufacturing cost.

Meanwhile, the integrated air inlet and outlet valve realize the functions of air inlet, air outlet and pressure equalization, and can meet the requirements of the pressure swing adsorption air path system.

The pressure swing adsorption air path system of the disclosure also has the advantages of the integrated air inlet and outlet valve because of adopting the integrated air inlet and outlet valve of the disclosure.

Figure 1:
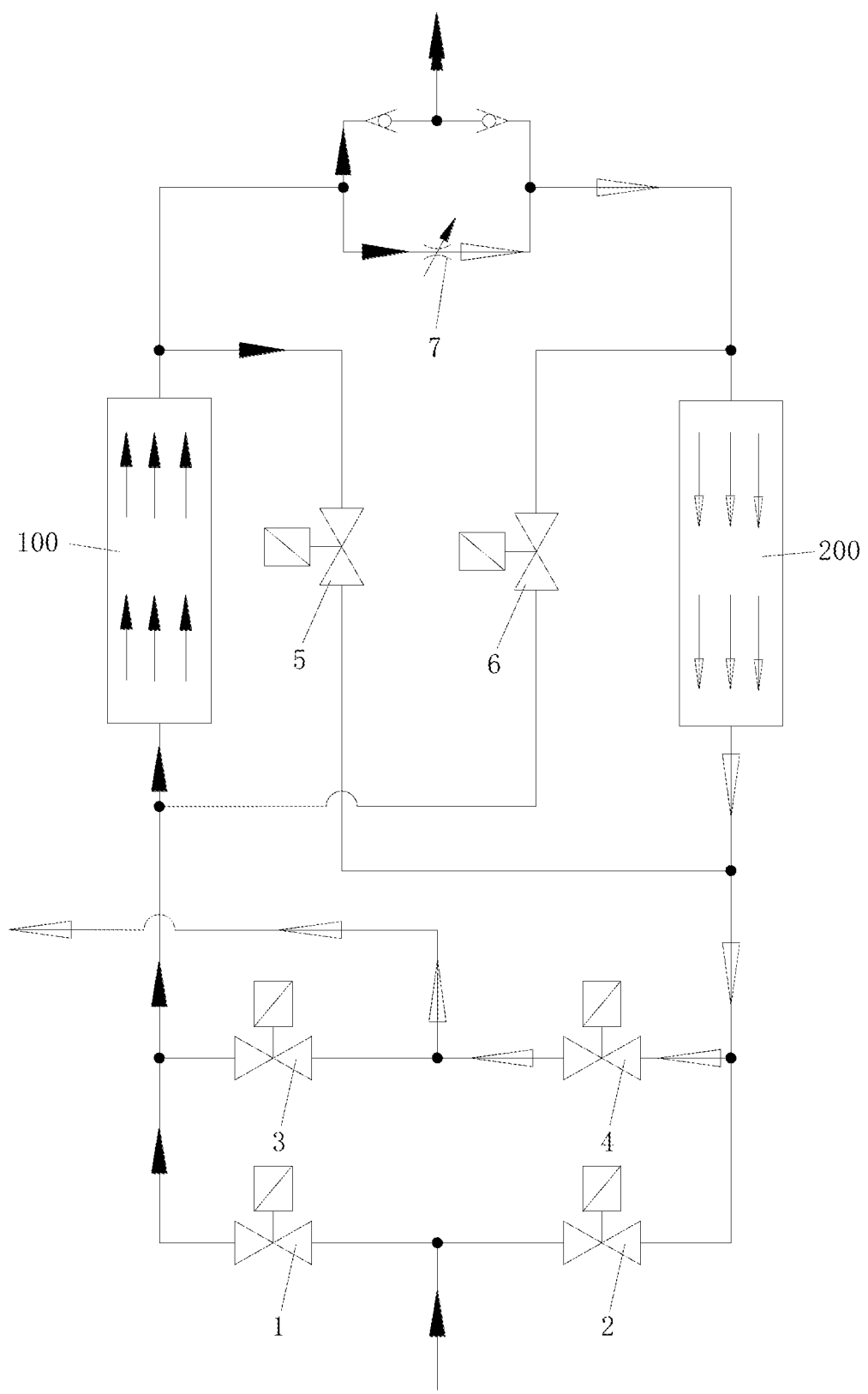
FIG. 1 is a schematic diagram of an existing pressure swing adsorption oxygen-making air path system.

REFERENCE NUMERALS 1 refers to valve body; 10 refers to side valve block; 11 refers to air inlet; 12 refers to air outlet; 13 refers to exhaust port; 14 refers to first communication hole; 15 refers to second communication hole; 21 refers to first air inlet and outlet port; 22 refers to second air inlet and outlet port; 31 refers to first control valve; 311 refers to first valve housing; 312 refers to first piston; 313 refers to first valve sheet; 314 refers to first ventilation cavity; 315 refers to first valve port; 316 refers to second valve port; 317 refers to third valve port; 32 refers to second control valve; 321 refers to second valve housing; 322 refers to second piston; 323 refers to second valve sheet; 324 refers to second ventilation cavity; 325 refers to fourth valve port; 326 refers to fifth valve port; 327 refers to sixth valve port; 33 refers to connecting channel; 34 refers to one-way valve; 35 refers to throttle valve; 50 refers to sealing plate; 51 refers to first channel; 52 refers to second channel; 100 refers to adsorption tower; 101 refers to first hole; 102 refers to second hole; 103 refers to third hole; 104 refers to fourth hole; 105 refers to fifth hole; 106 refers to sixth hole; 107 refers to seventh hole; 108 refers to eighth hole; 201 refers to recess; 301 refers to first connecting hole; and 302 refers to second connecting hole.

DETAILED DESCRIPTION

The disclosure will be further described in detail below with reference to the accompanying drawings and non-limiting embodiments.

As shown in FIG. 2 to FIG. 15, and in a non-limiting embodiment, an integrated air inlet and outlet valve includes a valve body 1, wherein the valve body is provided with an air inlet 11, an air outlet 12, an exhaust port 13 and two air path control units, the air path control unit includes a first air inlet and outlet port 21, a second air inlet and outlet port 22, a first control valve 31, a second control valve 32 and a connecting channel 33 connecting the first control valve 31 and the second control valve 32, the first control valve 31 is configured for controlling the first air inlet and outlet port 21 to be selectively communicated with the air inlet 11 or the connecting channel 33, the second control valve 32 is configured for controlling the connecting channel 33 to be selectively communicated with the exhaust port 13 or the second air inlet and outlet port 22, the second air inlet and outlet port 22 is connected with the air outlet 12 through a one-way valve 34 which enables air to flow to the air outlet 12 in one direction only, and the second air inlet and outlet ports 22 of the two air path control units are connected through a throttle valve 35.

The integrated air inlet and outlet valve is suitable for air inlet and outlet control of a pressure swing adsorption air path system. When the integrated air inlet and outlet valve is used, the first air inlet and outlet ports 21 and the second air inlet and outlet ports 22 of the two air path control units are respectively and correspondingly connected with two adsorption towers 100 of the pressure swing adsorption air path system, the adsorption tower 100 needing to work is defined as a tower A, the other adsorption tower 100 is defined as a tower B, the air path control unit connected with the tower A is a first air path control unit, and the air path control unit connected with the tower B is a second air path control unit.

When the tower A needs adsorption and the tower B needs regeneration, the first control valve 31 of the first air path control unit communicates the first air inlet and outlet port 21 with the air inlet 11, and the first control valve 31 of the second air path control unit communicates the first air inlet and outlet port 21 with the connecting channel 33. An air source is introduced through the air inlet 11, and the air may be discharged from the air outlet 12 through the first air inlet and outlet port 21, the tower A and the one-way valve 34 in turn, so that the adsorption of the tower A can be realized. Meanwhile, the first control valve 31 of the second air path control unit communicates the first air inlet and outlet port 21 with the air inlet 11, and the second control valve 32 communicates the connecting channel 33 with the exhaust port 13. Part of the air discharged after being treated by the tower A of the first air path control unit enters the second air inlet and outlet port 22 of the second air path control unit through the throttle valve 35, passes through the tower B, the first air inlet and outlet port 21, the first control valve 31, the connecting channel 33 and the second control valve 32 of the second air path control unit in turn, and is discharged from the exhaust port 13, so that the blowback regeneration of the tower B can be realized.

When pressure equalization is needed after the regeneration of the tower B is sufficient, the second control valve 32 of the second air path control unit communicates the connecting channel 33 with the second air inlet and outlet port 22. The air discharged after being treated by the tower A of the first air path control unit enters the tower B through the second air inlet and outlet port 22, the second control valve 32, the connecting channel 33, the first control valve 31 and the first air inlet and outlet 21 of the second air path control unit in turn, and the tower B is pressurized (or equalized). The pressure in the tower B gradually rises to a working pressure, making preparations for switching to the tower B for adsorption.

According to the integrated inlet and outlet valve of the disclosure, the first control valves 31 and the second control valves 32, the connecting channels 33, the one-way valves 34 and the throttle valves 35 of the two air path control units are integrally installed on the valve body 1. Therefore, when the integrated inlet and outlet valve is used in the pressure swing adsorption system, the integrated air inlet and outlet valve has the advantages of greatly reduced connecting pipelines which avoids the problem of redundant pipeline connections, simple installation and maintenance, reduced failure rate, and good aesthetics. Moreover, the integrated inlet and outlet valve has small overall size and small occupied space, which is beneficial to reducing the manufacturing cost. Meanwhile, the integrated air inlet and outlet valve realize the functions of air inlet, air outlet and pressure equalization, and can meet the requirements of the pressure swing adsorption air path system.

In this non-limiting embodiment, the first control valve 31 includes a first valve housing 311, a first piston 312 mounted in the first valve housing 311, a first valve sheet 313 connected with the first piston 312 and a first driving assembly configured for driving the first piston 312 to reciprocate linearly. The first valve housing 311 is detachably installed in an inner cavity provided in the valve body 1 and defines a first ventilation cavity 314, the first ventilation cavity 314 is provided with a first valve port 315 communicated with the first air inlet and outlet port 21, a second valve port 316 communicated with the air inlet 11 and a third valve port 317 communicated with the connecting channel 33. The first valve sheet 313 is located in the first ventilation cavity 314 and is capable of being driven by the first piston 312 reciprocating linearly to selectively seal the second valve port 316 or the third valve port 317. When the first valve sheet 313 seals the second valve port 316, the first air inlet and outlet port 21 is communicated with the connecting channel 33, and when the first valve sheet 313 seals the third valve port 317, the first air inlet and outlet port 21 is communicated with the air inlet 11. The first control valve 31 is detachably installed in the inner cavity of the valve body 1. The first control valve 31 may be manufactured and assembled separately and then mounted in the valve body 1, which is very simple to manufacture and assemble. Moreover, the first control valve 31 is mounted in the inner cavity of the valve body 1, which is conducive to improving the compactness of the structure. The above-mentioned first driving assembly may be operated in a way that the first piston 312 is driven by the air source to move unidirectionally and is driven to reset by means of a spring, or may be operated in other existing ways such as a cylinder directly driving the first piston 312 to reciprocate linearly.

In this non-limiting embodiment, the second control valve 32 includes a second valve housing 32, a second piston 322 mounted in the second valve housing 32, a second valve sheet 323 connected with the second piston 322 and a second driving assembly configured for driving the second piston 322 to reciprocate linearly. The second valve housing 321 is detachably installed in the inner cavity provided in the valve body 1 and defines a second ventilation cavity 324, the second ventilation cavity 324 is provided with a fourth valve port 325 communicated with the second air inlet and outlet port 22, a fifth valve port 326 communicated with the exhaust port 13 and a sixth valve port 327 communicated with the connecting channel 33. The second valve sheet 323 is located in the second ventilation cavity 324 and is capable of being driven by the second piston 322 reciprocating linearly to selectively seal the fourth valve port 325 or the fifth valve port 326. When the second valve sheet 323 seals the fourth valve port 325, the connecting channel 33 is communicated with the exhaust port 13, and when the second valve sheet 323 seals the fifth valve port 326, the connecting channel 33 is communicated with the second air inlet and outlet port 22. The second control valve 32 is detachably installed in the inner cavity of the valve body 1. The second control valve 32 may be manufactured and assembled separately and then mounted in the valve body 1, which is very simple to manufacture and assemble. Moreover, the second control valve 32 is mounted in the inner cavity of the valve body 1, which is conducive to improving the compactness of the structure. The above-mentioned second driving assembly may be operated in a way that the second piston 322 is driven by the air source to move unidirectionally and is driven to reset by means of a spring, or may be operated in other existing ways such as a cylinder directly driving the second piston 322 to reciprocate linearly.

In this non-limiting embodiment, the first ventilation cavities 314 of the two air path control units communicate with each other through a first communication hole 14 provided in the valve body 1. The valve body 1 is provided with a first hole 101 extending from outside of the valve body 1 to inside of the valve body 1 and communicated with the first communication hole 14, and the first hole 101 is used as the air inlet 11. The second ventilation cavities 324 of the two air path control units communicate with each other through a second communication hole 15 provided in the valve body 1. The valve body 1 is provided with a second hole 102 extending from outside of the valve body 1 to inside of the valve body 1 and communicated with the second communication hole 15, and the second hole 102 is used as the exhaust port 13. Such structure above is convenient for production and assembly, which is helpful to reduce the size of the valve body 1.

In this non-limiting embodiment, one side surface of the valve body 1 is used as a connecting surface, a side valve block 10 is detachably connected to the connecting surface, the side valve block 10 is provided with a third hole 103 and a fourth hole 104 extending from outside of the side valve block 10 to inside of the side valve block 10 corresponding to each air path control unit, the third hole 103 is used as the first air inlet and outlet port 21, and the fourth hole 104 is used as the second air inlet and outlet port 22. The third hole 103 of each air path control unit is communicated with the corresponding first valve port 315 through a fifth hole 105 extending from the connecting surface to inside of the valve body 1. The connecting channel 33 of each air path control unit includes a recess 201 which is arranged on the connecting surface and covered and sealed by the side valve block 10, the recess 201 is connected with a sixth hole 106 extending from the recess 201 to inside of the valve body 1 and communicated with the third valve port 317 and a seventh hole 107 extending from the recess 201 to inside of the valve body 1 and communicated with the sixth valve port 327. As there are many components to be integrated and passages between the components, by connecting the side valve block 10 on the connecting surface of the valve body 1, setting the first air inlet and outlet port 21 and the second air inlet and outlet port 22 on the side valve block 10, and then connecting the passages through holes or recesses on the connecting surface, the manufacturing difficulty can be greatly reduced, the size of the valve body 1 can be reduced, and the maintenance is convenient. The side valve block 10 is preferably mounted in the valve body 1 by screws, and a sealing ring is arranged between the side valve block 10 and the valve body 1 to ensure the tightness.

In this non-limiting embodiment, the valve body 1 is provided with a first channel 51 and a second channel 52 extending across the valve body 1 and arranged side by side, two sealing plates 50 which seal two ends of the first channel 51 and the second channel 52 are detachably mounted on the valve body 1. The valve body 1 is provided with two eighth holes 108 extending from the connecting surface to inside of the valve body 1, the second air inlet and outlet port 22 of one air path control unit is communicated with one ends of both the first channel 51 and the second channel 52 through one eighth hole 108, and the second air inlet and outlet port 22 of the other air path control unit is communicated with one ends of both the first channel 51 and the second channel 52 through the other eighth hole 108. The one-way valves 34 of the two air path control units are mounted in the first channel 51 between the eighth holes 108 at an interval, and the air outlet 12 extends from outside of the valve body 1 to inside of the valve body 1 and is communicated with the first channel 51 between the one-way valves 34 of the two air path control units. The throttle valve 35 is mounted in the second channel 52 between the two eighth holes 108. This mounting structure is convenient to manufacture and assemble, simplifies the air path, reduces the complexity of the air path, and is beneficial to improving the simple and compact structure of the integrated air inlet and outlet valve. The sealing plate 50 is preferably mounted in the valve body 1 by screws, and a sealing ring is arranged between the sealing plate 50 and the valve body 1 to ensure the tightness.

In this non-limiting embodiment, the fourth valve port 325 of each air path control unit is communicated with the first channel 51 or the second channel 52 which is communicated with the second air inlet and outlet port 22 of the other air path control unit through a first connecting hole 301 arranged on the valve body 1 and a second connecting hole 302 arranged on the scaling plate 50 in turn. Therefore, the second air inlet and outlet port 22 of each air path control unit is communicated with the first air inlet and outlet port 21 of the other air path control unit. The first connecting hole 301 and the second connecting hole 302 above are arranged inside the valve body 1 and the sealing plate 50, which can further reduce the connecting pipelines and improve the compactness of the structure. Moreover, the design and layout of the integrated air inlet and outlet valve is reasonable, and will not interfere with other passages and components, thus ensuring the simple and compact overall structure of the integrated air inlet and outlet valve. For the convenience of processing and manufacturing, the first connecting hole 301 and the second connecting hole 302 above may be formed by intersecting and connecting a plurality of holes extending from the surface of the valve body 1 or the sealing plate 50 to inside, and the opening ends of these holes on the surface of the valve body 1 or the sealing plate 50 are used as interfaces connected with another hole or sealed by plugs.

In this non-limiting embodiment, the valve body 1 is a hexahedral block, the exhaust port 13 is arranged on a top surface of the valve body 1, the air outlet 12 and the air inlet 11 are arranged on a bottom surface of the valve body 1, the two sealing plates 50 are respectively arranged on left and right surfaces of the valve body 1, and the side valve block 10 is arranged on a front surface or a rear surface of the valve body 1. This arrangement is convenient for the connection of pipelines and convenient for assembly.

Figure 2:
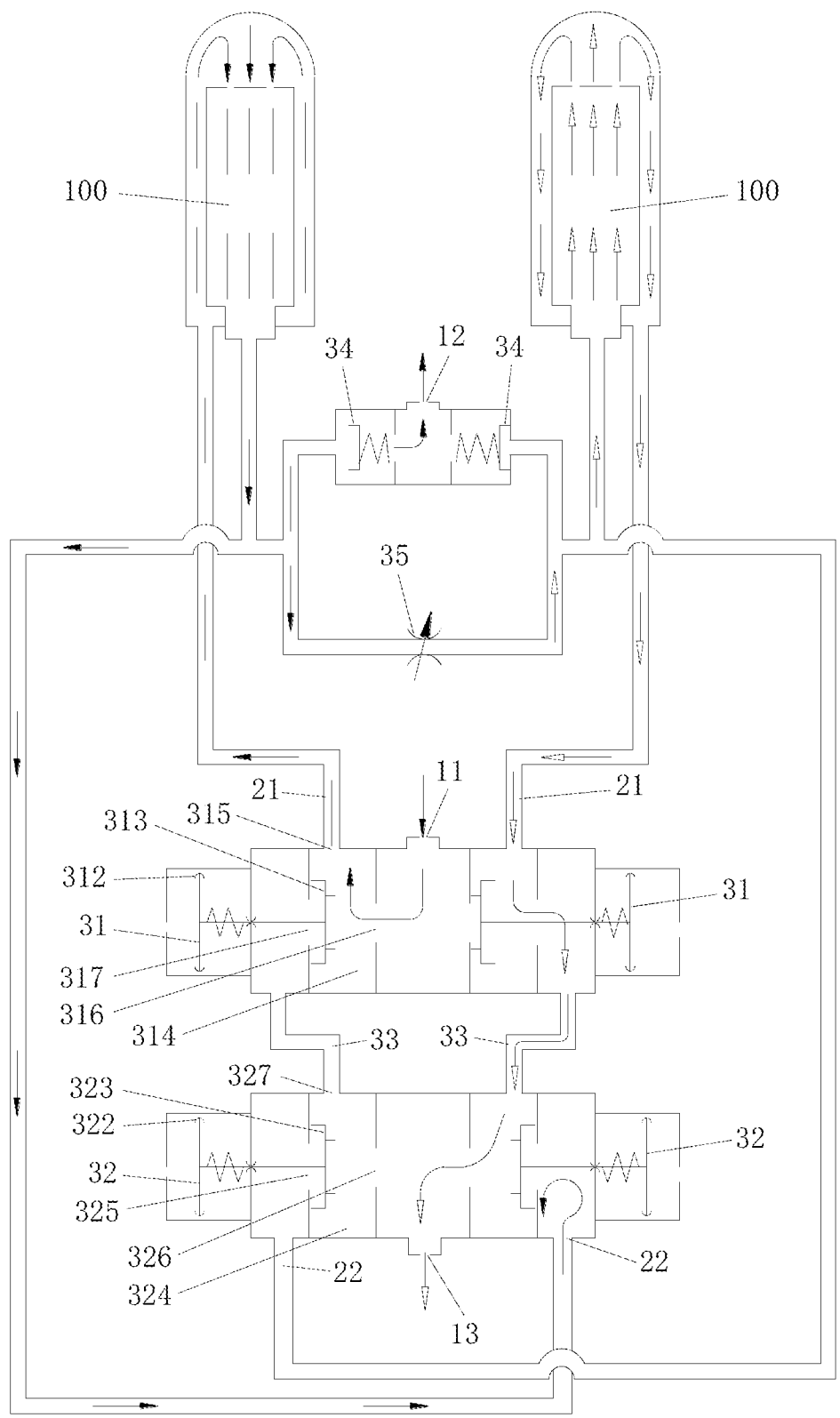
FIG. 2 is a schematic diagram of a pressure swing adsorption air path system according to the principles of the present disclosure.
Figure 3:
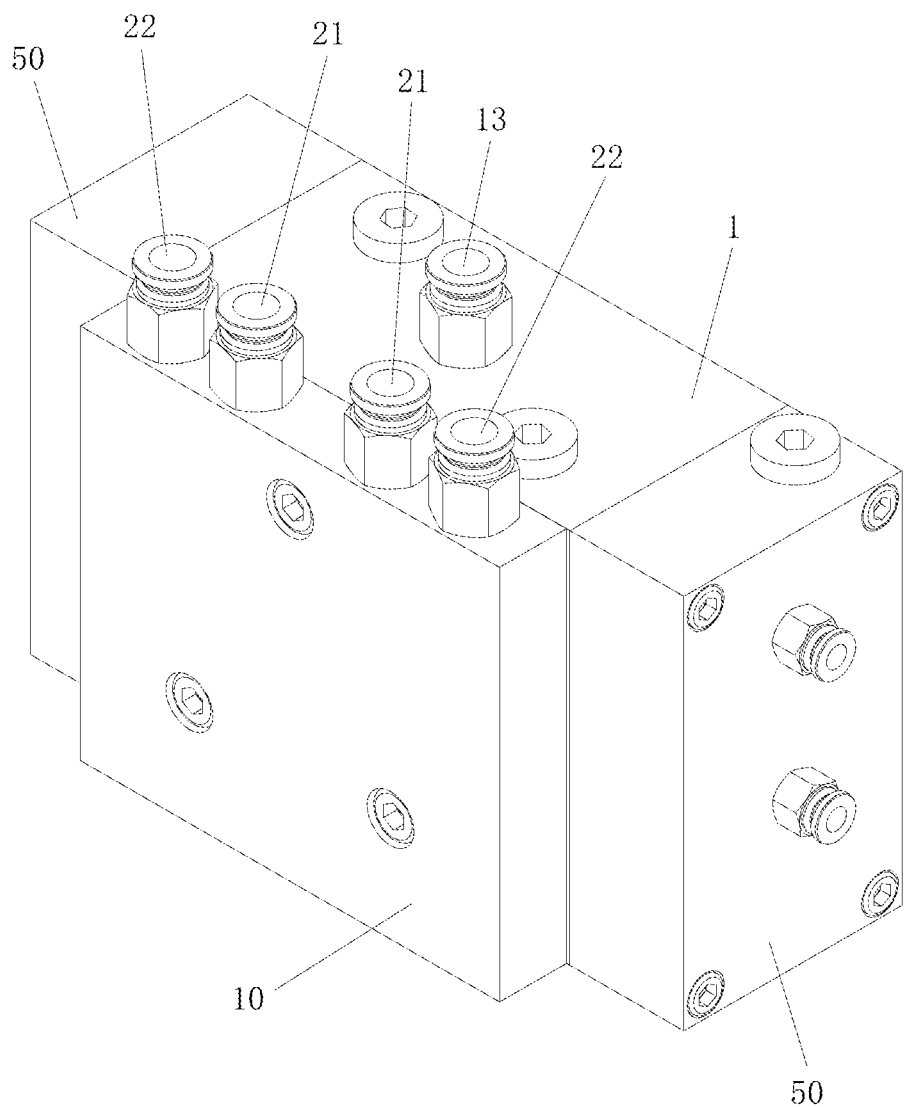
FIG. 3 is a three-dimensional structural schematic diagram of an integrated air inlet and outlet valve according to the principles of the present disclosure.
Figure 4:
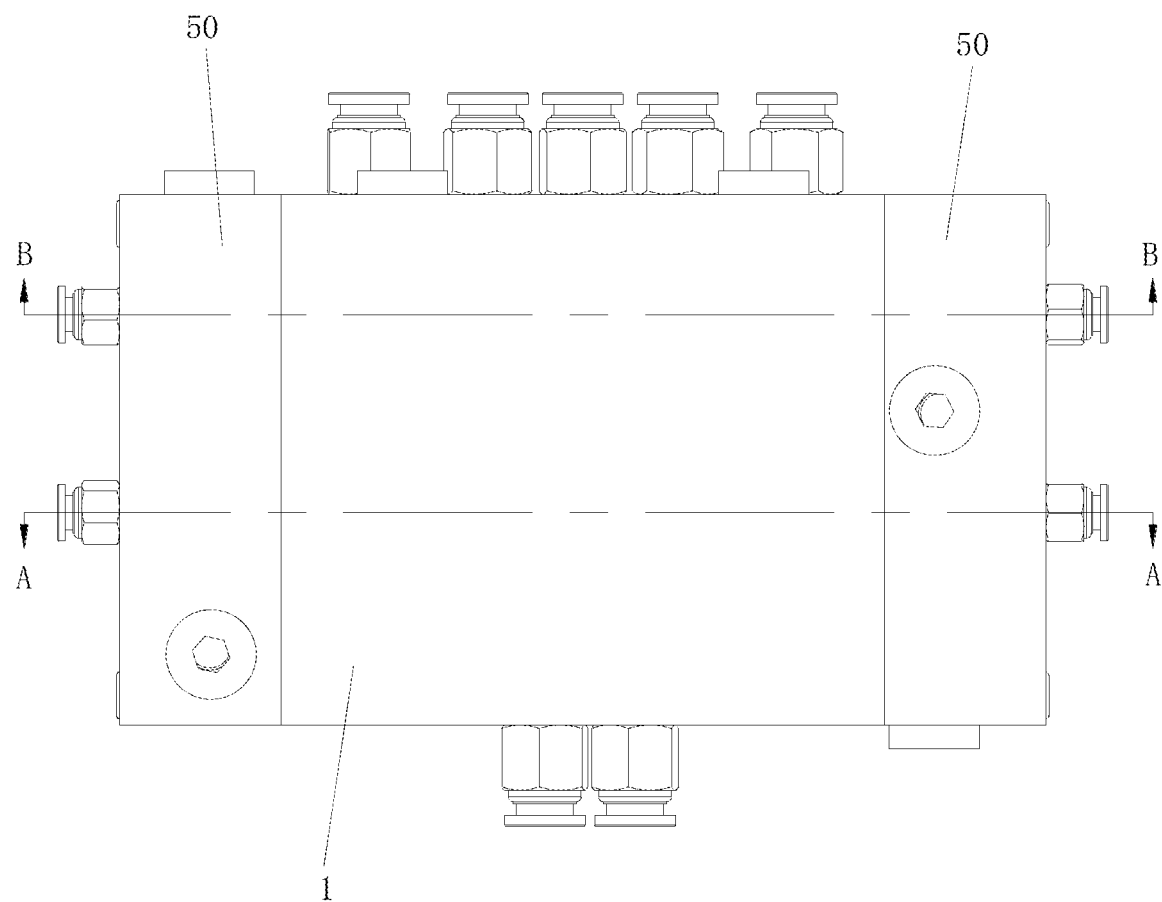
FIG. 4 is a front view of the integrated air inlet and outlet valve of FIG. 3.
Figure 5:
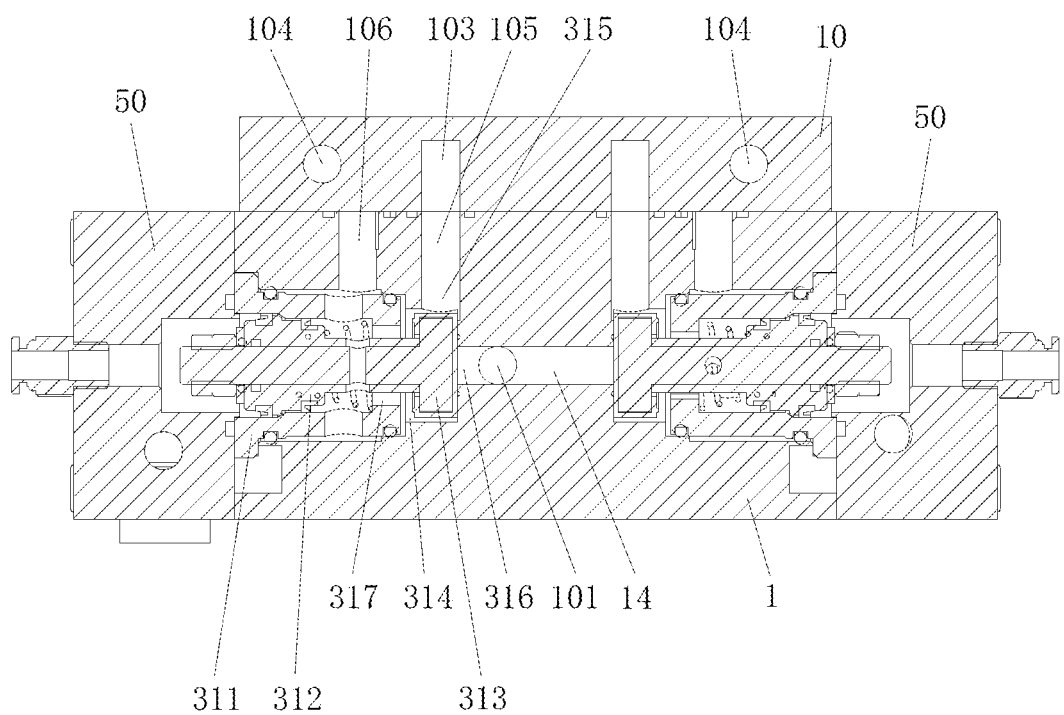
FIG. 5 is a cross-sectional view along line A-A of FIG. 4.
Figure 6:
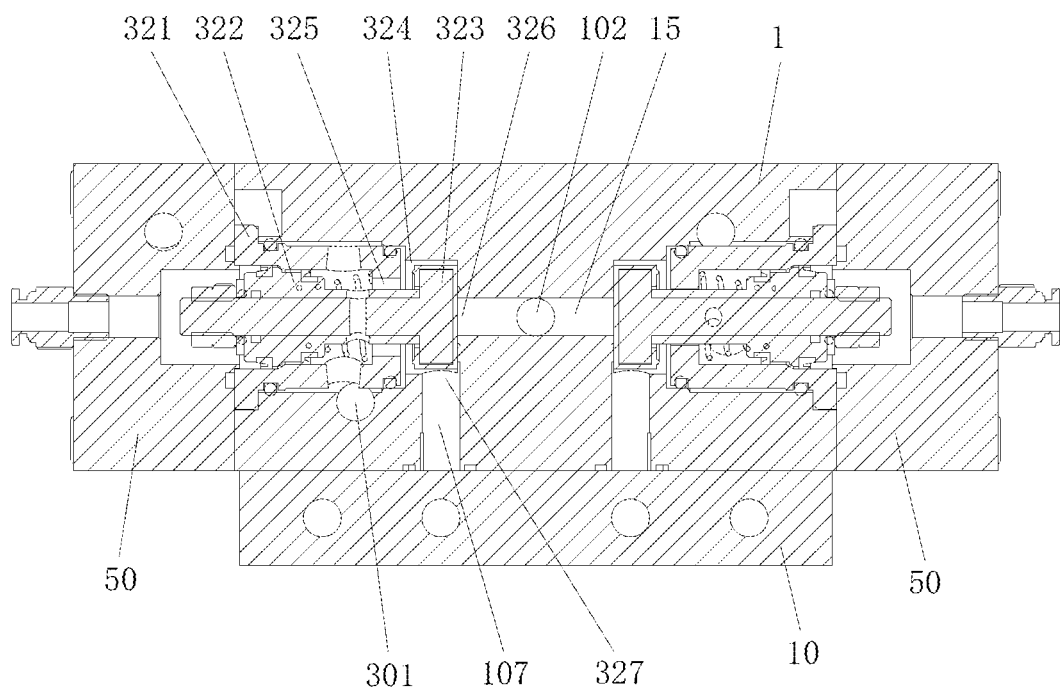
FIG. 6 is a cross-sectional view along line B-B of FIG. 4.
Figure 7:
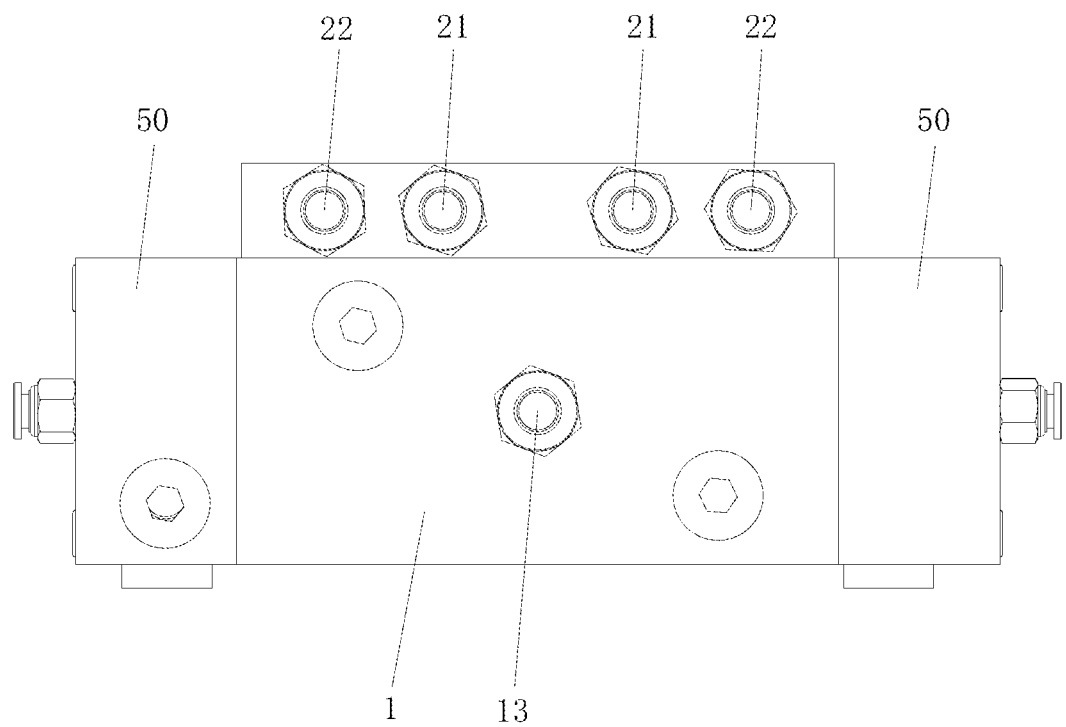
FIG. 7 is a top view of the integrated air inlet and outlet valve of FIG. 3.
Figure 8:
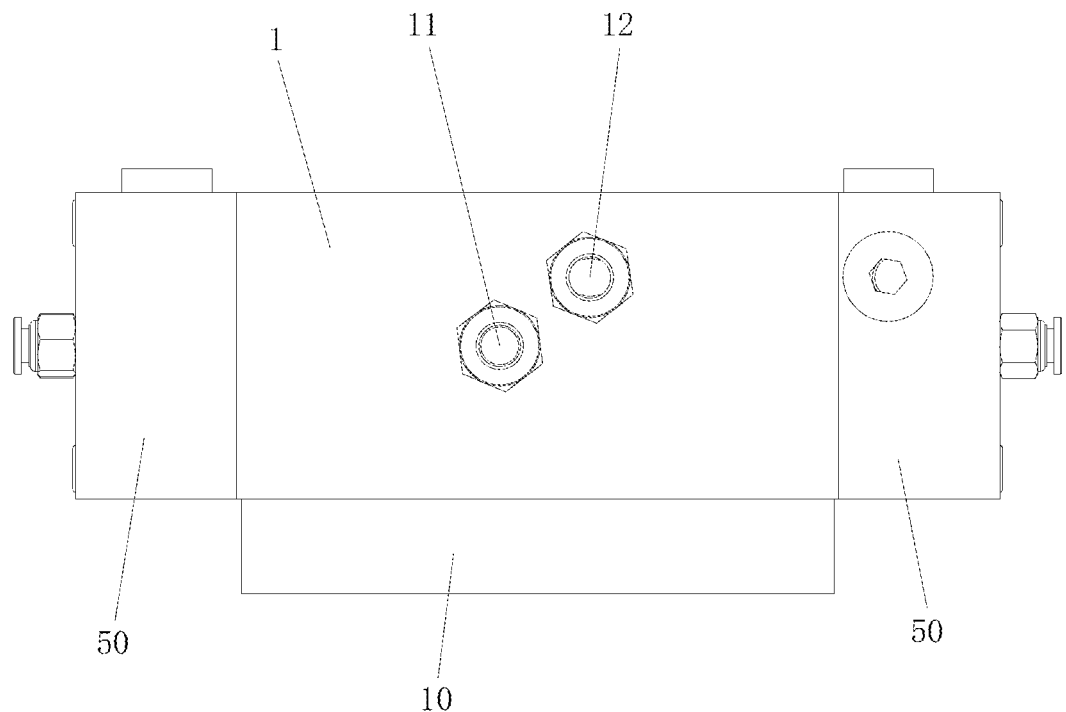
FIG. 8 is a bottom view of the integrated air inlet and outlet valve of FIG. 3.
Figure 9:
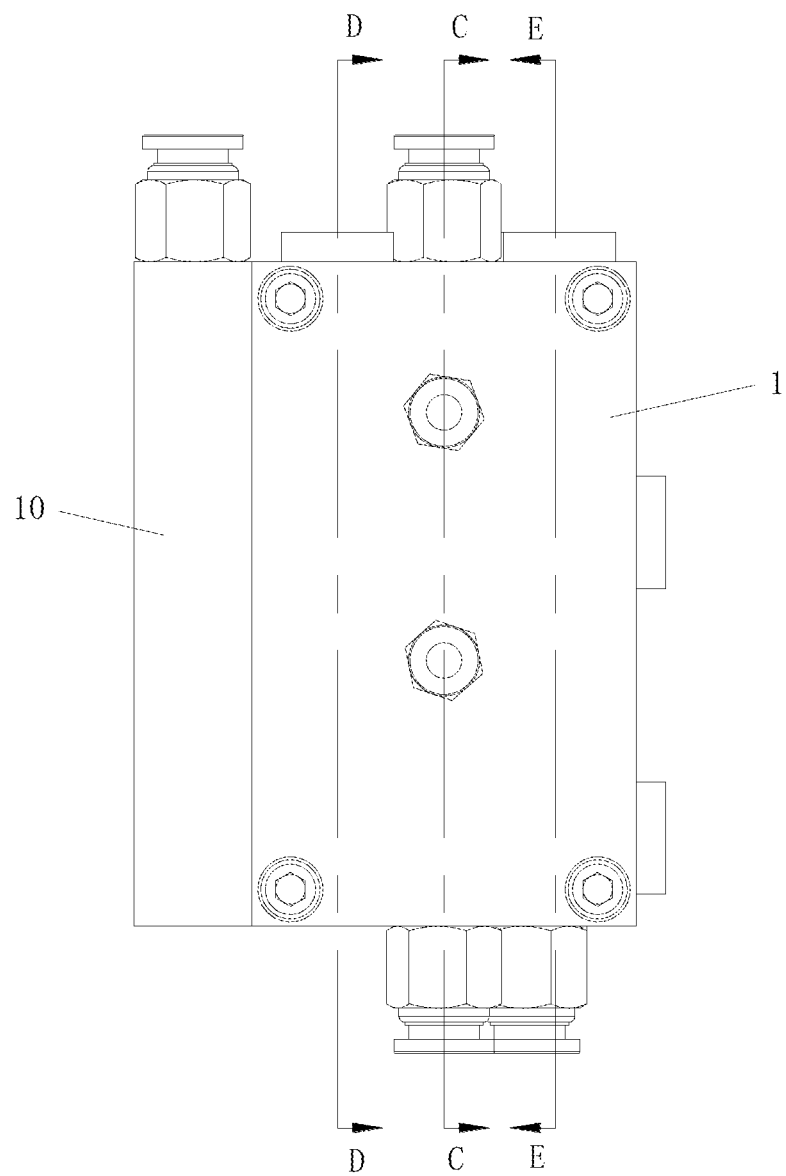
FIG. 9 is a left view of the integrated air inlet and outlet valve of FIG. 3.
Figure 10:
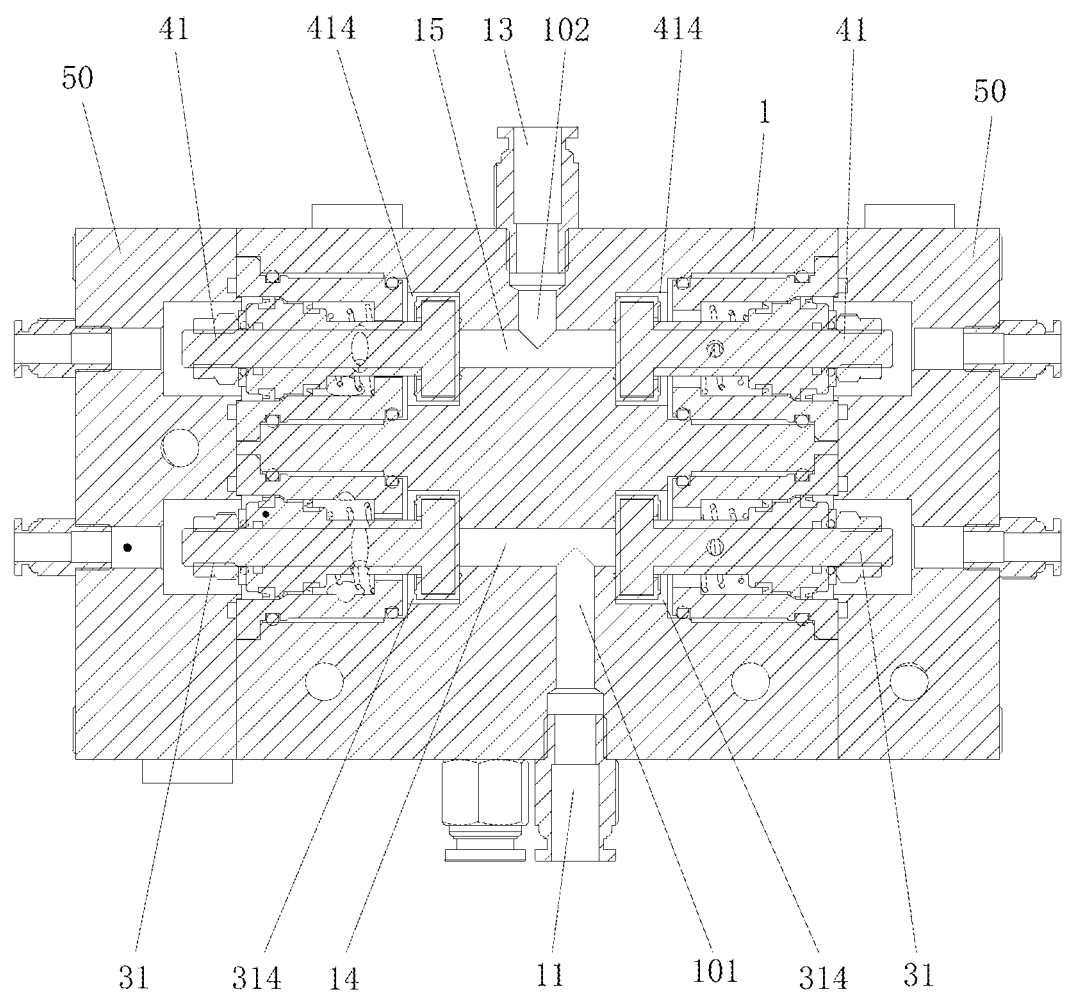
FIG. 10 is a cross-sectional view along line C-C of FIG. 9.
Figure 11:
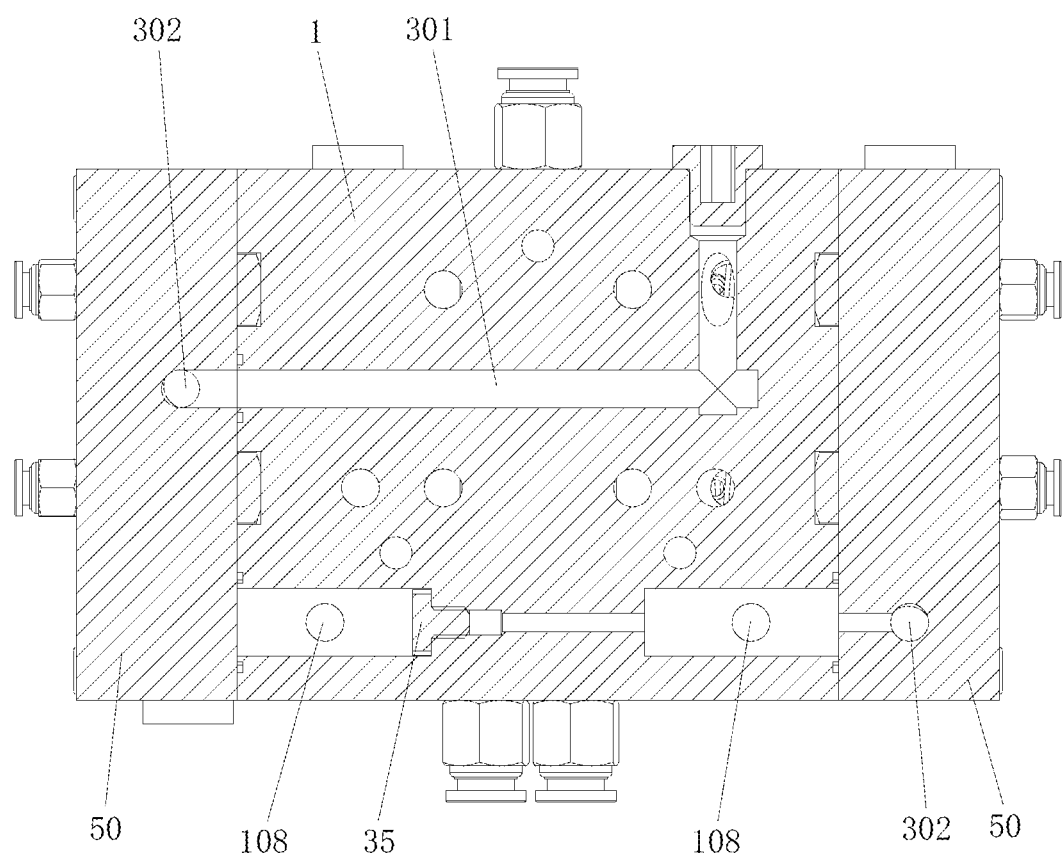
FIG. 11 is a cross-sectional view along line D-D of FIG. 9.
Figure 12:
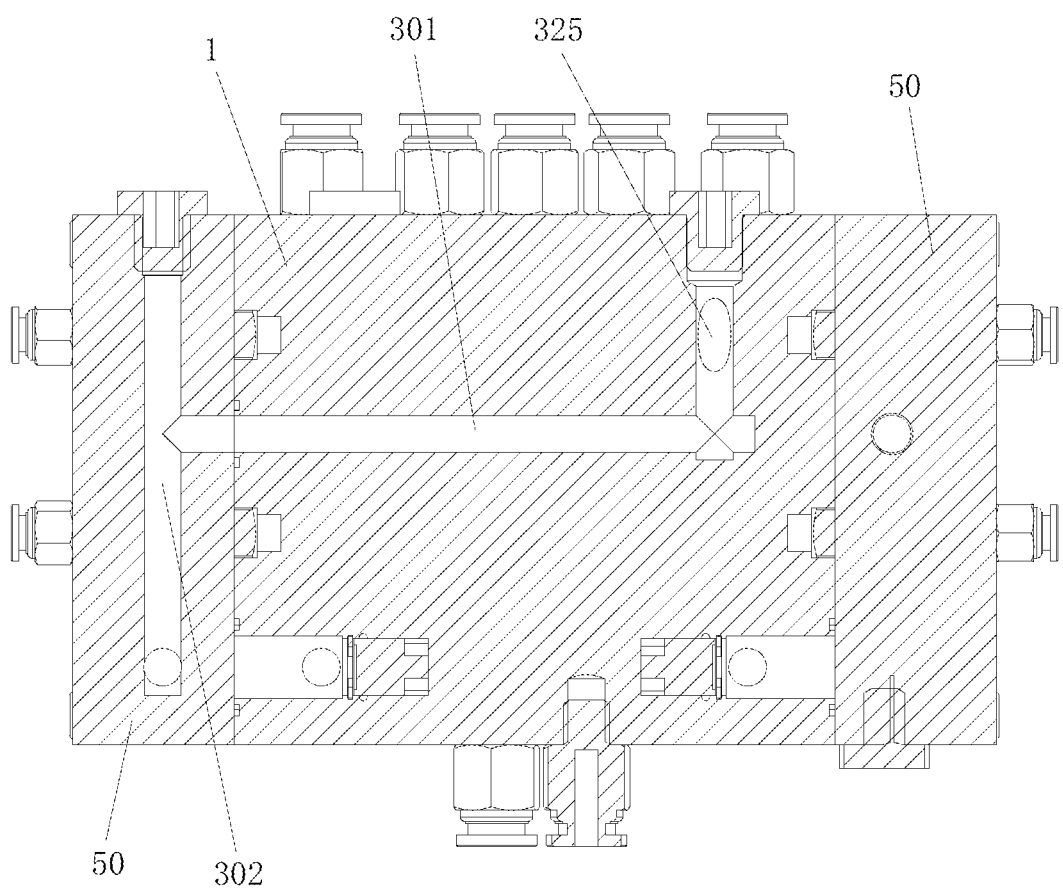
FIG. 12 is a cross-sectional view along line E-E of FIG. 9.
Figure 13:
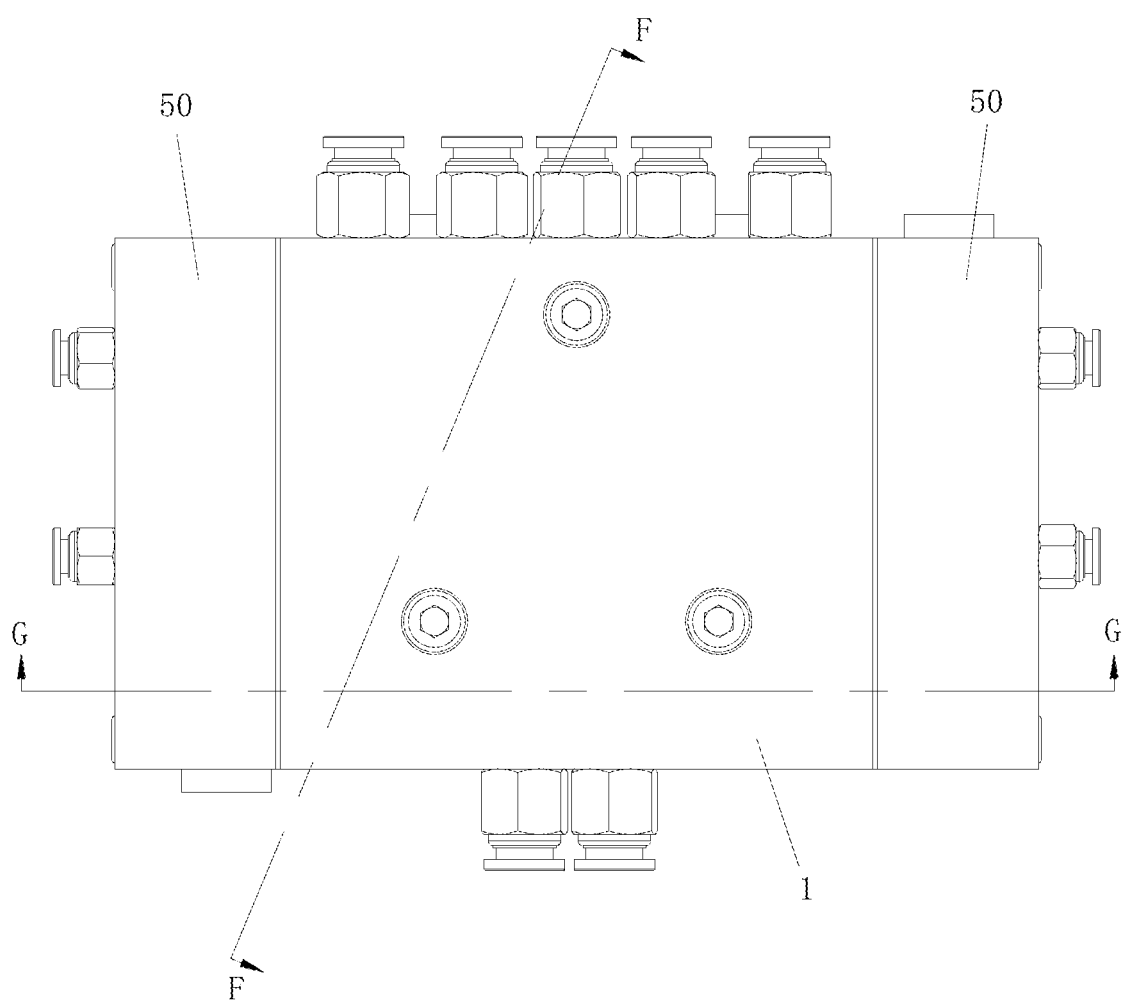
FIG. 13 is a rear view of the integrated air inlet and outlet valve of FIG. 3.
Figure 14:
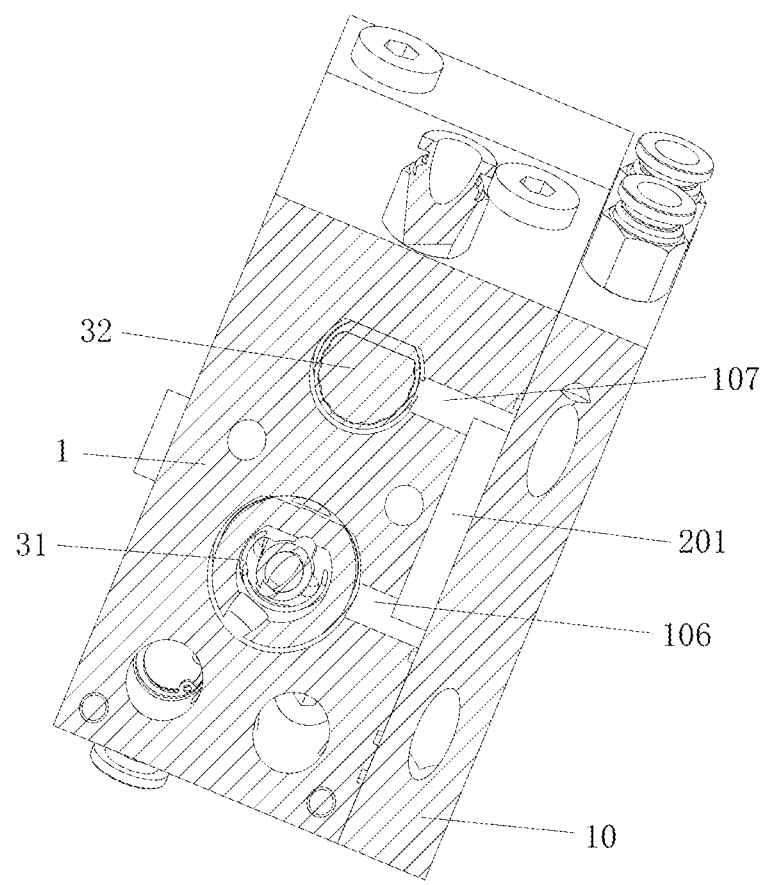
FIG. 14 is a cross-sectional view along line F-F of FIG. 13.
Figure 15:
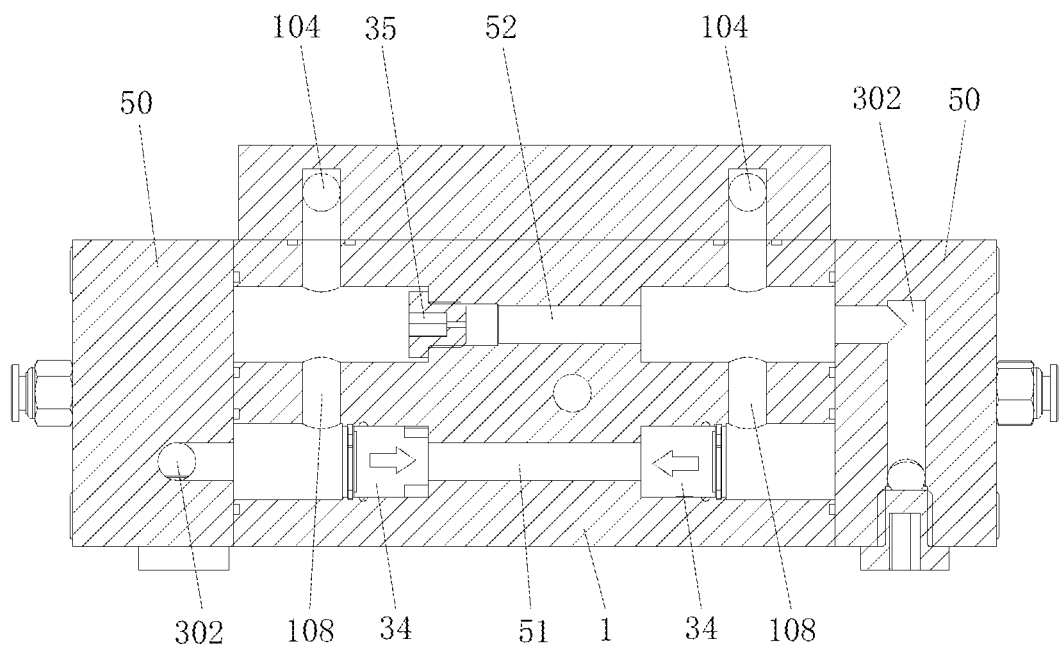
FIG. 15 is a cross-sectional view along line G-G of FIG. 13.

In a non-limiting embodiment, and as shown in FIG. 2, provided is a pressure swing adsorption air path system including two adsorption towers 100, the adsorption tower 100 having two air inlet and outlet ends, and further including the integrated air inlet and outlet valve described above, wherein the first air inlet and outlet ports 21 and the second air inlet and outlet ports 22 of the two air path control units in the integrated air inlet and outlet valve are respectively connected with the two air inlet and outlet ends of the two adsorption towers 100 correspondingly.

As the pressure swing adsorption air path system adopts the integrated inlet and outlet valve described above, the pressure swing adsorption air path system also has the advantages of the integrated inlet and outlet valve.

In this non-limiting embodiment, the two air inlet and outlet ends of the adsorption tower 100 are located at the same end of the adsorption tower 100. This is beneficial to reduce the overall size and volume of the device and reduce the occupied space.

The above are only the preferred non-limiting embodiments of the disclosure, and the protection scope of the disclosure is not limited to the above embodiments. For those of ordinary skills in the art, the improvements and changes obtained without departing from the technical concept of the disclosure should also be regarded as the protection scope of the disclosure.

What is claimed is:

1. An integrated air inlet and outlet valve, comprising a valve body, wherein the valve body is provided with an air inlet, an air outlet, an exhaust port and two air path control units, each of the air path control units comprises a first air inlet and outlet port, a second air inlet and outlet port, a first control valve, a second control valve and a connecting channel connecting the first control valve and the second control valve, the first control valve is configured for controlling the first air inlet and outlet port to be selectively communicated with the air inlet or the connecting channel, the second control valve is configured for controlling the connecting channel to be selectively communicated with the exhaust port or the second air inlet and outlet port, the second air inlet and outlet port is connected with the air outlet through a one-way valve which enables air to flow to the air outlet in one direction only, and the second air inlet and outlet ports of the two air path control units are connected through a throttle valve.

2. The integrated air inlet and outlet valve according to claim 1, wherein each first valve comprises a first valve housing, a first piston mounted in the first valve housing, a first valve sheet connected with the first piston, and a first driving assembly configured for driving the first piston to reciprocate linearly, the first valve housing is detachably installed in an inner cavity provided in the valve body and defines a first ventilation cavity, the first ventilation cavity is provided with a first valve port communicated with the first air inlet and outlet port, a second valve port communicated with the air inlet and a third valve port communicated with the connecting channel, the first valve sheet is located in the first ventilation (314) cavity and is capable of being driven by the first piston reciprocating linearly to selectively seal the second valve port or the third valve port.

3. The integrated air inlet and outlet valve according to claim 2, wherein each second control valve comprises a second valve housing, a second piston mounted in the second valve housing, a second valve sheet connected with the second piston and a second driving assembly configured for driving the second piston to reciprocate linearly, the second valve housing is detachably installed in the inner cavity provided in the valve body and defines a second ventilation cavity, the second ventilation cavity is provided with a fourth valve port communicated with the second air inlet and outlet port, a fifth valve port communicated with the exhaust port and a sixth valve port communicated with the connecting channel, the second valve sheet is located in the second ventilation cavity and is capable of being driven by the second piston; reciprocating linearly to selectively seal the fourth valve port or the fifth valve port.

4. The integrated air inlet and outlet valve according to claim 3, wherein the first ventilation cavities of the two air path control units are communicated through a first communication hole, the valve body is provided with a first hole extending from outside of the valve body to inside of the valve body and communicated with the first communication hole, and the first hole is used as the air inlet; and the second ventilation cavities of the two air path control units are communicated through a second communication hole provided in the valve body, the valve body is provided with a second hole extending from outside of the valve body to inside of the valve body and communicated with the second communication hole, and the second hole is used as the exhaust port.

5. The integrated air inlet and outlet valve according to claim 3, wherein one side surface of the valve body is used as a connecting surface, a side valve block is detachably connected to the connecting surface, the side valve block is provided with a third hole and a fourth hole extending from outside of the side valve block to inside of the side valve block corresponding to each air path control unit, the third hole is used as the first air inlet and outlet port, and the fourth hole is used as the second air inlet and outlet port; the third hole of each air path control unit is communicated with the corresponding first valve port through a fifth hole extending from the connecting surface to inside of the valve body; and the connecting channel of each air path control unit comprises a recess which is arranged on the connecting surface and covered and sealed by the side valve block, the recess is connected with a sixth hole extending from the recess to inside of the valve body and communicated with the third valve port and a seventh hole extending from the recess to inside of the valve body and communicated with the sixth valve port.

6. The integrated air inlet and outlet valve according to claim 5, wherein the valve body is provided with a first channel; and a second channel extending across the valve body and arranged side by side, two sealing plates which seal two ends of the first channel and the second channel are detachably mounted on the valve body, the valve body is provided with two eighth holes extending from the connecting surface to inside of the valve body, the second air inlet and outlet port of one air path control unit is communicated with one ends of both the first channel and the second channel through one eighth hole, and the second air inlet and outlet port of the other air path control unit is communicated with one ends of both the first channel and the second channel through the other eighth hole; the one-way valves of the two air path control units are mounted in the first channel between the eighth holes at an interval, and the air outlet extends from outside of the valve body to inside of the valve body and is communicated with the first channel between the one-way valves of the two air path control units; and the throttle valve is mounted in the second channel between the two eighth holes.

7. The integrated air inlet and outlet valve according to claim 6, wherein the fourth valve port of each air path control unit is communicated with the first channel or the second channel which is communicated with the second air inlet and outlet port of the other air path control unit through a first connecting hole arranged on the valve body and a second connecting hole arranged on the sealing plate in turn.

8. The integrated air inlet and outlet valve according to claim 6, wherein the valve body is a hexahedral block, the exhaust port is arranged on a top surface of the valve body, the air outlet and the air inlet are arranged on a bottom surface of the valve body, the two sealing plates are respectively arranged on left and right surfaces of the valve body, and the side valve block is arranged on a front surface or a rear surface of the valve body.

9. A pressure swing adsorption air path system, comprising two adsorption towers, each of the adsorption towers having two air inlet and outlet ends, wherein the system further comprises the integrated air inlet and outlet valve according to claim 1, the first air inlet and outlet ports and the second air inlet and outlet ports of the two air path control units in the integrated air inlet and outlet valve are respectively connected with the two air inlet and outlet ends of the two adsorption towers correspondingly.

10. The pressure swing adsorption air path system according to claim 9, wherein the two air inlet and outlet ends of each adsorption tower are located at the same end of each adsorption tower.

11. The pressure swing adsorption air path system according to claim 9, wherein each first control valve comprises a first valve housing, a first piston mounted in the first valve housing, a first valve sheet connected with the first piston and a first driving assembly configured for driving the first piston to reciprocate linearly, the first valve housing is detachably installed in an inner cavity provided in the valve body and defines a first ventilation cavity, the first ventilation cavity is provided with a first valve port communicated with the first air inlet and outlet port, a second valve port communicated with the air inlet and a third valve port communicated with the connecting channel, the first valve sheet is located in the first ventilation cavity and is capable of being driven by the first piston reciprocating linearly to selectively seal the second valve port or the third valve port.

12. The pressure swing adsorption air path system according to claim 11, wherein each second control valve comprises a second valve housing, a second piston mounted in the second valve housing, a second valve sheet connected with the second piston and a second driving assembly configured for driving the second piston to reciprocate linearly, the second valve housing is detachably installed in the inner cavity provided in the valve body and defines a second ventilation cavity, the second ventilation cavity is provided with a fourth valve port communicated with the second air inlet and outlet port, a fifth valve port communicated with the exhaust port and a sixth valve port communicated with the connecting channel, the second valve sheet is located in the second ventilation cavity and is capable of being driven by the second piston reciprocating linearly to selectively seal the fourth valve port or the fifth valve port.

13. The pressure swing adsorption air path system according to claim 12, wherein the first ventilation cavities of the two air path control units are communicated through a first communication hole provided in the valve body, the valve body is provided with a first hole extending from outside of the valve body to inside of the valve body and communicated with the first communication hole, and the first hole is used as the air inlet; and the second ventilation cavities of the two air path control units are communicated through a second communication hole provided in the valve body, the valve body is provided with a second hole extending from outside of the valve body to inside of the valve body and communicated with the second communication hole, and the second hole is used as the exhaust port.

14. The pressure swing adsorption air path system according to claim 12, wherein one side surface of the valve body is used as a connecting surface, a side valve block is detachably connected to the connecting surface, the side valve block is provided with a third hole and a fourth hole extending from outside of the side valve block to inside of the side valve block corresponding to each air path control unit, the third hole is used as the first air inlet and outlet port, and the fourth hole is used as the second air inlet and outlet port; the third hole of each air path control unit is communicated with the corresponding first valve port through a fifth hole extending from the connecting surface to inside of the valve body; and the connecting channel of each air path control unit comprises a recess which is arranged on the connecting surface and covered and sealed by the side valve block, the recess is connected with a sixth hole extending from the recess to inside of the valve body and communicated with the third valve port and a seventh hole extending from the recess to inside of the valve body and communicated with the sixth valve port.

15. The pressure swing adsorption air path system according to claim 14, wherein the valve body is provided with a first channel and a second channel extending across the valve body and arranged side by side, two sealing plates which seal two ends of the first channel and the second channel are detachably mounted on the valve body, the valve body is provided with two eighth holes extending from the connecting surface to inside of the valve body, the second air inlet and outlet port of one air path control unit is communicated with one ends of both the first channel and the second channel through one eighth hole, and the second air inlet and outlet port of the other air path control unit is communicated with one ends of both the first channel and the second channel through the other eighth hole; the one-way valves of the two air path control units are mounted in the first channel between the eighth holes at an interval, and the air outlet extends from outside of the valve body to inside of the valve body and is communicated with the first channel between the one-way valves of the two air path control units; and the throttle valve is mounted in the second channel between the two eighth holes.

16. The pressure swing adsorption air path system according to claim 15, wherein the fourth valve port of each air path control unit is communicated with the first channel or the second channel which is communicated with the second air inlet and outlet port of the other air path control unit through a first connecting hole arranged on the valve body and a second connecting hole arranged on the sealing plate in turn.

17. The pressure swing adsorption air path system according to claim 15, wherein the valve body is a hexahedral block, the exhaust port is arranged on a top surface of the valve body, the air outlet and the air inlet are arranged on a bottom surface of the valve body, the two sealing plates are respectively arranged on left and right surfaces of the valve body, and the side valve block is arranged on a front surface or a rear surface of the valve body.

* * * * *